(12) United States Patent
Borosak et al.

(10) Patent No.: US 11,294,027 B2
(45) Date of Patent: Apr. 5, 2022

(54) METHOD FOR SUPPRESING NOISE AND INCREASING SPEED IN MINIATURIZED RADIO FREQUENCY SIGNAL DETECTORS

(71) Applicant: A-ELEKTRONIK D.O.O., Zagreb (HR)

(72) Inventors: Marko Borosak, Zagreb (HR); Matej Paradzik, Metkovic (HR)

(73) Assignee: A-ELEKTRONIK D.O.O., Zagreb (HR)

( * ) Notice: Subject to any disclaimer, the term of this patent is extended or adjusted under 35 U.S.C. 154(b) by 211 days.

(21) Appl. No.: 16/645,708

(22) PCT Filed: Feb. 28, 2019

(86) PCT No.: PCT/HR2019/000004
§ 371 (c)(1),
(2) Date: Mar. 9, 2020

(87) PCT Pub. No.: WO2020/174257
PCT Pub. Date: Sep. 3, 2020

(65) Prior Publication Data
US 2021/0132184 A1 May 6, 2021

(51) Int. Cl.
*G01S 7/02* (2006.01)
*G01S 7/03* (2006.01)
(Continued)

(52) U.S. Cl.
CPC .............. *G01S 7/021* (2013.01); *G01S 7/023* (2013.01); *G01S 7/03* (2013.01); *G01S 7/40* (2013.01); *G01S 13/58* (2013.01); *G01S 13/931* (2013.01)

(58) Field of Classification Search
CPC . G01S 7/022; G01S 7/023; G01S 7/03; G01S 7/032; G01S 7/038; G01S 7/2813;
(Continued)

(56) References Cited

U.S. PATENT DOCUMENTS

| 4,088,955 A | * | 5/1978 | Baghdady | G01S 7/023 455/283 |
| 5,134,406 A | * | 7/1992 | Orr | G01S 7/022 342/20 |

(Continued)

FOREIGN PATENT DOCUMENTS

GB          2 431 307 A          4/2007

OTHER PUBLICATIONS

International Search Report and Written Opinion dated Oct. 31, 2019 in PCT/HR2019/000004 filed on Feb. 28, 2019.
(Continued)

*Primary Examiner* — Peter M Bythrow
(74) *Attorney, Agent, or Firm* — Xsensus LLP

(57) ABSTRACT

The invention discloses design of the wideband single, dual or three channel signal detector with ability to suppress interference and crosstalk from two PLL LO signal generators (101 & 102) with selection of best pairs of LO frequencies (108 & 109) out of all possible pairs in the way that all interference is kept out-of-band and with efficient filtering in IF (103) and baseband (104) to achieve high sensitivity for wideband channels without requirement for heavy shielding or adding of absorptive materials to the receiver subsystems. Method for measurement and creating array with frequency pairs to control PLL generators with optimal frequency distribution on each PLL generator for uniform and fastest possible scanning of all required bands is also disclosed.
In addition to signal analyzer (801) design and implementation method for digital signal processing for purpose of detection of speed measurement radars is disclosed with advanced AI (808) supported system for classification of the detected signals. Classifier AI module is implemented with SVM (Supported Vector Machine) (913) pretrained and periodically retrained for signal classification in the operation of the detector, and with additional neural network (910)
(Continued)

used for assisting in classification of to SVM (913) unknown signals that could be detected during the operation of the detector and to update dynamical signature database (911) used for periodical retraining of the SVM (913) classifier. Optional user interface is possible for manual classification of detected signals and to update dynamical database (911) with new signatures with high weight for retraining.

11 Claims, 9 Drawing Sheets

(51) Int. Cl.
*G01S 7/40* (2006.01)
*G01S 13/58* (2006.01)
*G01S 13/931* (2020.01)

(58) Field of Classification Search
CPC .......... G01S 7/2928; G01S 7/40; G01S 13/58; G01S 13/931
See application file for complete search history.

(56) References Cited

U.S. PATENT DOCUMENTS

| | | | | |
|---|---|---|---|---|
| 5,305,007 | A * | 4/1994 | Orr | G01S 7/022 342/20 |
| 5,315,302 | A * | 5/1994 | Katsukura | G01S 7/022 342/20 |
| 5,461,383 | A * | 10/1995 | Ono | G01S 7/022 342/20 |
| 5,517,197 | A * | 5/1996 | Algeo | G01S 7/032 342/130 |
| 5,852,417 | A * | 12/1998 | Valentine | G01S 7/023 342/20 |
| 5,856,801 | A | 1/1999 | Valentine et al. | |
| 5,900,832 | A * | 5/1999 | Valentine | G01S 7/021 342/20 |
| 5,917,441 | A * | 6/1999 | Valentine | G01S 7/022 342/20 |
| 6,054,948 | A * | 4/2000 | Dean | H01Q 21/0025 342/372 |
| 6,069,580 | A * | 5/2000 | Martinson | G01S 7/022 342/165 |
| 6,137,406 | A * | 10/2000 | Ono | G01S 7/021 340/552 |
| 6,140,809 | A * | 10/2000 | Doi | G01R 23/173 324/76.19 |
| 6,169,511 | B1 * | 1/2001 | Iwakuni | G01S 7/022 342/13 |
| 6,175,324 | B1 | 1/2001 | Valentine et al. | |
| 6,175,325 | B1 * | 1/2001 | Ono | G01S 7/022 342/195 |
| 6,249,218 | B1 | 6/2001 | Blair | |
| 6,400,305 | B1 * | 6/2002 | Kuhn | G01S 7/022 342/193 |
| 6,483,452 | B1 * | 11/2002 | Iwakini | G01S 7/022 342/20 |
| 6,507,308 | B1 * | 1/2003 | Ono | G01S 7/022 342/195 |
| 6,587,068 | B2 | 7/2003 | Kuhn et al. | |
| 6,614,385 | B2 | 9/2003 | Kuhn et al. | |
| 6,617,995 | B2 * | 9/2003 | Kim | G01S 7/022 180/170 |
| 6,670,905 | B1 | 12/2003 | Orr | |
| 6,683,561 | B1 * | 1/2004 | Tait | G01S 7/282 342/175 |
| 6,836,238 | B1 | 12/2004 | Orr et al. | |
| 7,002,511 | B1 * | 2/2006 | Ammar | G01S 7/282 342/134 |
| 7,023,374 | B2 | 4/2006 | Jossef et al. | |
| 7,061,423 | B1 | 6/2006 | Valentine et al. | |
| 7,388,537 | B2 | 6/2008 | Martinson et al. | |
| 7,397,416 | B2 | 7/2008 | Orr et al. | |
| 7,450,051 | B1 | 11/2008 | Valentine et al. | |
| 7,492,313 | B1 * | 2/2009 | Ehret | G01S 7/032 342/158 |
| 7,576,679 | B1 | 8/2009 | Orr et al. | |
| 7,579,976 | B1 | 8/2009 | Valentine et al. | |
| 7,714,772 | B2 * | 5/2010 | Shono | G01S 13/345 342/110 |
| 7,804,440 | B1 | 9/2010 | Orr | |
| 7,999,721 | B2 | 8/2011 | Orr | |
| 8,373,588 | B2 | 2/2013 | Kuhn | |
| 8,525,723 | B2 | 9/2013 | Orr et al. | |
| 8,624,771 | B2 | 1/2014 | Kuhn | |
| 8,760,339 | B2 | 6/2014 | Kuhn | |
| 8,970,422 | B2 | 3/2015 | Washlow et al. | |
| 8,988,272 | B2 * | 3/2015 | Chernukhin | G01S 7/022 342/20 |
| 9,046,594 | B1 | 6/2015 | Orr et al. | |
| 9,255,987 | B2 | 2/2016 | De Wilde et al. | |
| 9,279,881 | B2 | 3/2016 | Orr et al. | |
| 9,557,408 | B2 | 1/2017 | Chernukhin | |
| 10,078,128 | B2 | 9/2018 | Chernukhin | |
| 11,061,108 | B1 * | 7/2021 | Orr | G01S 13/91 |
| 2002/0135504 | A1 | 9/2002 | Singer | |
| 2003/0058154 | A1 * | 3/2003 | Kim | G01S 7/022 342/20 |
| 2003/0090406 | A1 * | 5/2003 | Longstaff | G01S 13/88 342/22 |
| 2004/0263378 | A1 * | 12/2004 | Jossef | H04K 3/45 342/20 |
| 2005/0242984 | A1 * | 11/2005 | Waters | H04M 1/72403 342/52 |
| 2006/0139203 | A1 * | 6/2006 | Kim | H04M 1/6075 342/20 |
| 2007/0152872 | A1 | 7/2007 | Woodington | |
| 2007/0152874 | A1 * | 7/2007 | Woodington | G01S 13/931 342/159 |
| 2008/0287085 | A1 * | 11/2008 | Forstner | G01S 7/032 455/293 |
| 2011/0241923 | A1 * | 10/2011 | Chernukhin | G01S 7/022 342/20 |
| 2012/0154203 | A1 * | 6/2012 | Vacanti | G01S 13/44 342/149 |
| 2012/0249354 | A1 * | 10/2012 | Kim | G01S 7/4806 342/20 |
| 2012/0268306 | A1 | 10/2012 | Coburn et al. | |
| 2013/0257640 | A1 | 10/2013 | De Wilde et al. | |
| 2015/0331088 | A1 * | 11/2015 | Kim | G01S 13/343 327/47 |
| 2017/0139035 | A1 | 5/2017 | Chernukhin | |
| 2017/0322288 | A1 * | 11/2017 | Hasch | G01S 7/032 |
| 2019/0072601 | A1 * | 3/2019 | Dzierwa | G01R 29/0892 |
| 2020/0132804 | A1 * | 4/2020 | Yeh | G01S 7/038 |
| 2020/0209353 | A1 * | 7/2020 | Subburaj | G01S 7/4052 |

OTHER PUBLICATIONS

GB Search Report searched dated Jan. 10, 2007 in GB Application 0620492.9 filed on Oct. 16, 2006.

* cited by examiner

METHOD FOR SUPPRESING NOISE AND INCREASING SPEED IN MINIATURIZED RADIO FREQUENCY SIGNAL DETECTORS

FIELD OF INVENTION

The invention relates to radio frequency (RF) signal detectors that incorporate digital signal processing (DSP) unit. Such detectors are usually used in a spectral analyzer instruments and in radar signal detectors.

SUMMARY OF INVENTION

Radar signal detectors use various techniques to scan radio frequency spectrum and to detect radiation in their field of view. There are several methods for implementation of such detectors and most recently more and more devices are implemented as software defined radio (SDR) with digital processing of received signals. Digital processing enables a detector to extract detected radar's frequency spectrum signature and then process this signature to determine if it's a valid speed measuring radar signature, a signal of interest, or if it belongs to a source of no interest, for instance a vehicle inbuilt collision avoidance radar, door opener radar or other sources. SDR approach requires wide baseband channel and processing in software, and as bandwidth of the baseband into analog to digital converter (ADC) is much wider than in traditional detectors, interference and noise problems are also significantly more difficult. For multiple band detectors that use multiple local oscillators (LO) or detectors with multiple mixing (down-converting) stages problem is even bigger and will introduce false detections and consequently decreased sensitivity. Shielding and infilling with absorbing materials helps in suppression of interference and crosstalk but requires additional space on device circuit boards, larger housing and will add additional cost. Advanced approach of LO signal generators combining to suppress interference and crosstalk by smart choice of LO frequency pairs in the detector down-converter stages can be applied to suppress interference and crosstalk. This method will eliminate unwanted interference and images from mixing products in down-converter mixers and combined with filtering of out-of-band components will result in clean baseband signal with only wanted signal converted to the digital domain.

Once signals are converted to the digital domain additional processing steps can be applied to distinguish the signal type and to determine if the user is to be alarmed or if the signal is of no interest. The most complex task of this process is to distinguish modulated Frequency Shift Keying (FSK) or Frequency Modulated Continuous Wave (FMCW) speed measuring radar signals from the signals of vehicle inbuilt anti-collision or inbuilt adaptive cruise control radars. As new models of radars are continuously introduced to the market, both speed measuring and vehicle inbuilt or for other applications of no interest to a user of the detector, classification is quite complex and maintaining of a database is very demanding task with almost certainty missing some signatures in the database eventually. To overcome this problem in the detector is used artificial intelligence (AI) method that can learn signatures and to determine with some level of certainty on the type of unknown signatures. AI processing module is fed with spectral signatures detected in the signal detector module and signatures are analyzed over time to determine various parameters changes over time and this information is used to determine on the signature type. Combination of Support Vector Machine and Deep Learning methods are used in the AI module and are combined with dynamical database of known signatures for signals of interest and signals of no interest. Learning process is continuously active during operation of the detector and is continuously upgrading its knowledge database. Usually the detector is used in semi-supervised mode of learning, but it can be also switched to completely unsupervised mode. In the semi-supervised mode predefined known signatures database is used and during the operation of the device a user is able to manually classify detected signals enhancing the learning process for new signatures. Learning modes can be configured and user can determine the acceptable level of distraction for semi-supervised mode. Such approach has significantly higher reliability in classification of radar signatures and will miss significantly lower number of speed measuring radar detections, with significantly reduced number of false alarms caused by vehicle inbuilt radars, door opener radars, traffic counter radars, or other signals on no interest.

Prevous State of Art

In a radio frequency (RF) signal detectors designed to scan a wide frequency band common implementation is comprising two local oscillator (LO) signal generators and down-conversion that is done in two steps. This architecture is used to minimize bandwidth of IF signals and to simplify implementation of circuits. Downside of the architecture is usually significant intermodulation and spurious emissions for some combinations of LO generator frequencies as the effect of crosstalk. Intermodulation and crosstalk in general degrade the performance of the detector and prevents proper operation or significantly affects receiver sensitivity for some combinations of frequencies. Additionally, this effect can manifest false detections of the detector. Crosstalk and intermodulation are usually solved by isolating, shielding and filtering but this can be quite difficult when small dimension of the circuit, small device mass or very low cost is desired.

In the past decade speed measuring radars have significantly evolved technologically and now measure not only a vehicle speed but also its location on the road (so called 3D radars). These new features became possible by change in the radar operation principle from traditional continuous wave single frequency Doppler to modulated waveform in most cases FSK or FMCW. These radar types have ability to detect and measure speeding vehicles in scenarios not previously possibly such as in a dense traffic, to precisely locate and capture better quality images and even can be used in the multiple lane roads to detect and track multiple vehicles simultaneously. Not only the speed measuring radars technology has evolved but also frequency bands used by it has also changed and now spans from 10.5 GHz to 36.1 GHz with three distinct bands being: X band 10.5-10.55 GHz, K band 24.0-24.25 GHz and Ka band 33.3-36.1 GHz. Such distribution of speed measuring radars frequency poses a requirement for detectors to have 3 band receivers with very wide bands. Detector bandwidth in the X band needs to be at least 50 MHz, in the K band at least 250 MHz and in the Ka band at least 2800 MHz. As speed measuring radars can also be implemented as short on time pulse radars (so called POP) with active signal time measured in milliseconds, scanning of all bands must be very fast to enable detection of such short pulses. Bringing together all above requirements for a detector into a single device is difficult, especially by using traditional narrow frequency scanning method with threshold peak detector and is the reason why more and more detector devices are presently implemented as SDR. Such detectors are tracking over time signal shape or distribution of energy in the frequency spectrum and are determining the type of signal based on those parameters. If valid speed measuring radar is determined from signal frequency spectrum and time tracking then alarm is given and forwarded to user interface (UI) and is usually accompanied with information of detected signal type, frequency, strength etc. Alarming of a user is based on the detected signatures and can be implemented in a way that any detection will automatically lead to an alarm, which is how the older generation detectors work, or it can be done in a more sophisticated way with additional processing steps to minimize false alarms towards a user but while still alarming for each detected signal of interest—speed measuring radar. True/false alarms ratio is very important parameter for high-end detectors as it is directly related to usability of the device. With present situation where almost every new passenger vehicle has at least one and very often several inbuilt radars for safety or autonomous driving, usability of traditional detectors that will alarm a user on any detected signal is poor.

Signal signature classification in present state of the art radar detectors requires large database of known signal signatures. It can be implemented as positive signatures database where all known speed measuring radars signatures are stored and if received signature is not found in the database it means it is of no interest and is discarded. In this case average number of false alarms will be low but there is significant probability of missing real signal of interest detections caused by a non-current database. The other approach is to have negative signatures database and to discard only detected signal signatures that are found in this database and known as signals of no interest. This approach will generate more false alarms as it is almost impossible to maintain negative signatures database properly but will produce better probability of speed measuring radar detection. Some present detectors also use combination of positive and negative databases to lower the number of unknown signatures and to improve ratio between true and false alarms. In all above cases present state of art SDR detectors require a significant amount of work to maintain the databases and keep the true and false alarms ratio in acceptable level.

Additional feature commonly used is to discard some alarms as false by knowing the location of a detection and comparing the location to a database of known false alarm locations. This feature does not help in a case of moving false alarm sources like the beforementioned vehicle inbuilt radars.

Due to the national regulations some frequency bands or segments and some speed measuring radar types are not present on some geographical locations and some detectors use this information in the form of another database to further improve the true/false alarms ration but again the feature does not help in the case of moving false alarm sources.

Maintenance of such mentioned databases is significant work either for a manufacturer or for a user of the detector. The quality of the databases directly translates to the usability of the device and to user experience. Databases that are not updated, with lot of missing signatures will lead to degradation of the true/false alarms ratio and detector quality perception degradation.

DETAILED DESCRIPTION OF THE INVENTION

A method for suppressing noise and increasing speed in miniaturized radio frequency signal detectors has been disclosed.

The primary objective of the present invention is to enable construction of miniaturized RF signal detectors where space considerations prohibit isolation, shielding and absorbing as primary solutions to intermodulation noise produced by multiple LO generators working at different frequencies in a tight space. The invention solves this problem by using the disclosed method of using a DSP to control the LO generators where DSP has a program logic and a memory of prestored values and by using those can always set the down-conversion in a manner resulting in minimal intermodulation noise.

Secondary objective is to enable fastest possible scanning of two or more RF bands in a signal detector where bands have different bandwidths and one of the bands is down-converted by using the beforementioned dual stage mixing process. Uniform scanning of all bands wider and narrower is also achieved by disclosed method that uses a DSP controlled LO generators.

An additional objective is to enable differentiating the received signals to signals of interest and signals of no interest or noise by implementing an artificial intelligence (AI) algorithm in the DSP. Disclosed method presents an extra step in suppressing unwanted or noise signals.

In the approach with two LO signal generators and two consecutive mixer stages a circuit is designed in a way that for each desired frequency or frequency band in the RF input signal a down-conversion to baseband is possible with various possible combinations of LO1 and LO2 frequencies that all give same sum frequency. In such approach it is also possible to select a pair of frequencies LO1 and LO2 out of all possible pairs for each RF or RF band that also results in eliminated or minimized intermodulation noise.

Microwave frequency generators and mixers, as well as strip-line conductors do not have perfectly flat characteristics over usable frequency range so changing two mixer stages as described above does result in combined characteristic being different for different LO1 and LO2 pairs even that sum frequency of down-conversion is the same.

Figure 5:
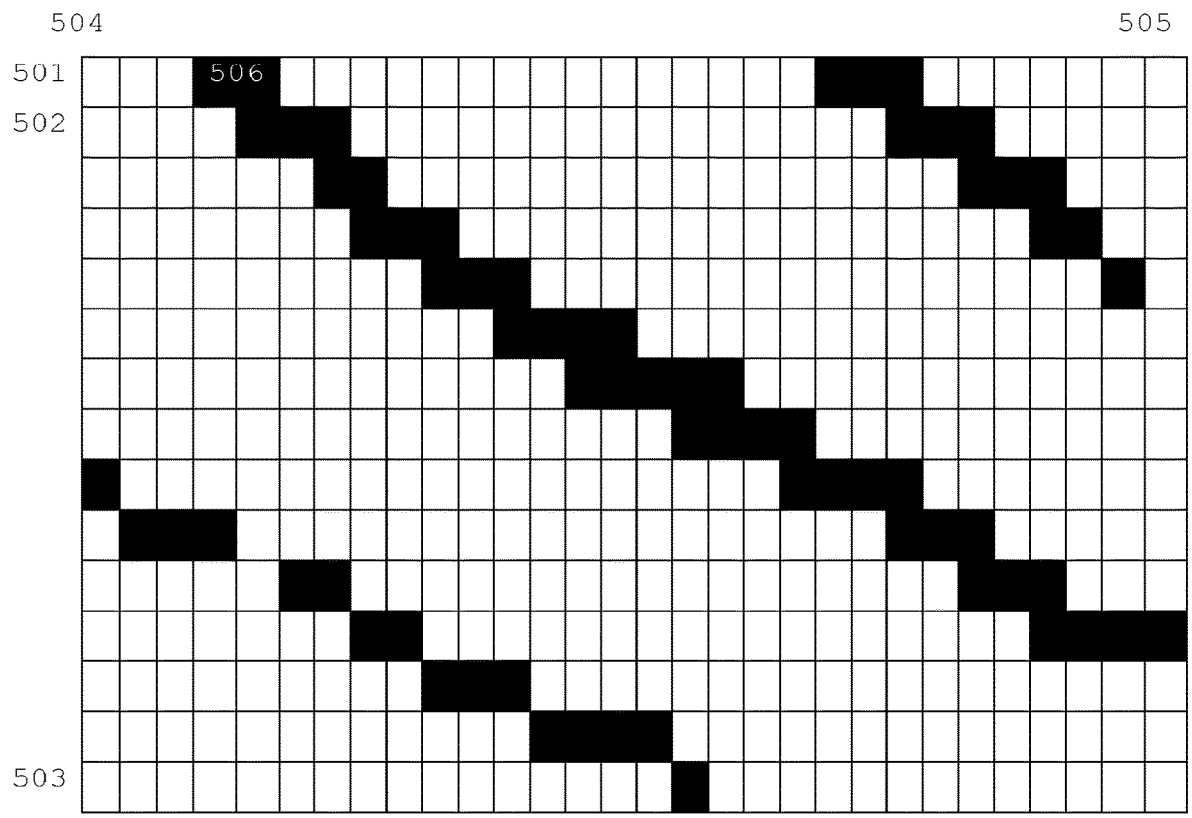
FIG. 5 shows a sample table of intermodulation intensities for single input channel.

Selection of the best pairs of the frequencies for LO generators out of a union of all possible segment pairs is process done offline, measured on several temperatures and input power supply voltage as all those parameters can affect quality of selected pair. The procedure is comprised of signal recording for all possible pairs in the complete frequency range and measurement of parameters for each segment. 2D table shown on the FIG. 5 is created and stored to the DSP memory by division of the segment peak value with segment average noise value.

Optimal asset allocation algorithm is applied to the stored table to select best LO frequency pairs, cells with minimal value of calculated ratio between peak and average noise value, with uniform distribution of scanning along the frequency bandwidth. Thresholding is applied to eliminate every cell (frequency pair) where ratio is bigger than 1 and all other cells are valid choice for the scanning pattern. Scanning pattern is created in the way that cell (frequency pair) with minimal value is used for each requested segment following uniform scanning distribution across all frequency bands. Sorting is applied to the selected scanning pattern to further minimize number of frequency changes for both generators. Resulting array with selected LO frequency pairs for all segments is than stored in the DSP memory and is used in the real-time operation of the device.

Figure 6:
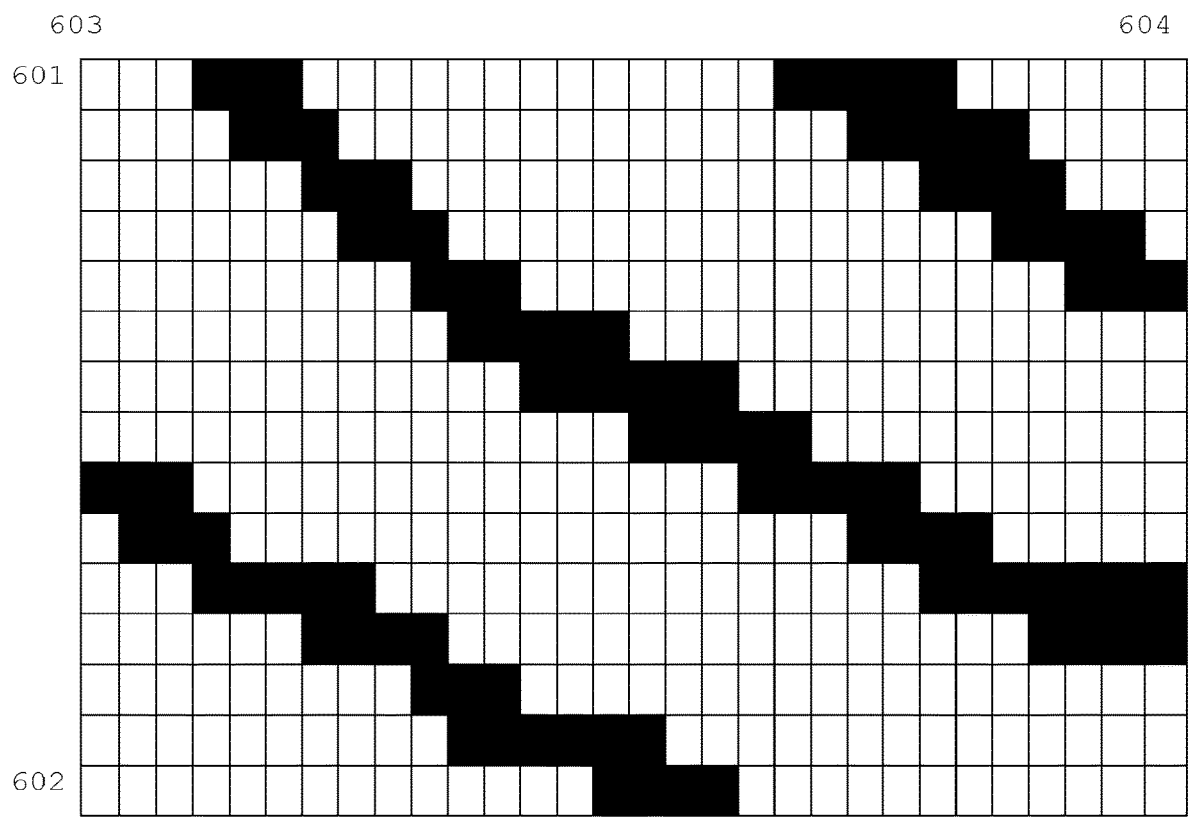
FIG. 6 shows a sample table of intermodulation intensities for two input channels.
Figure 7:
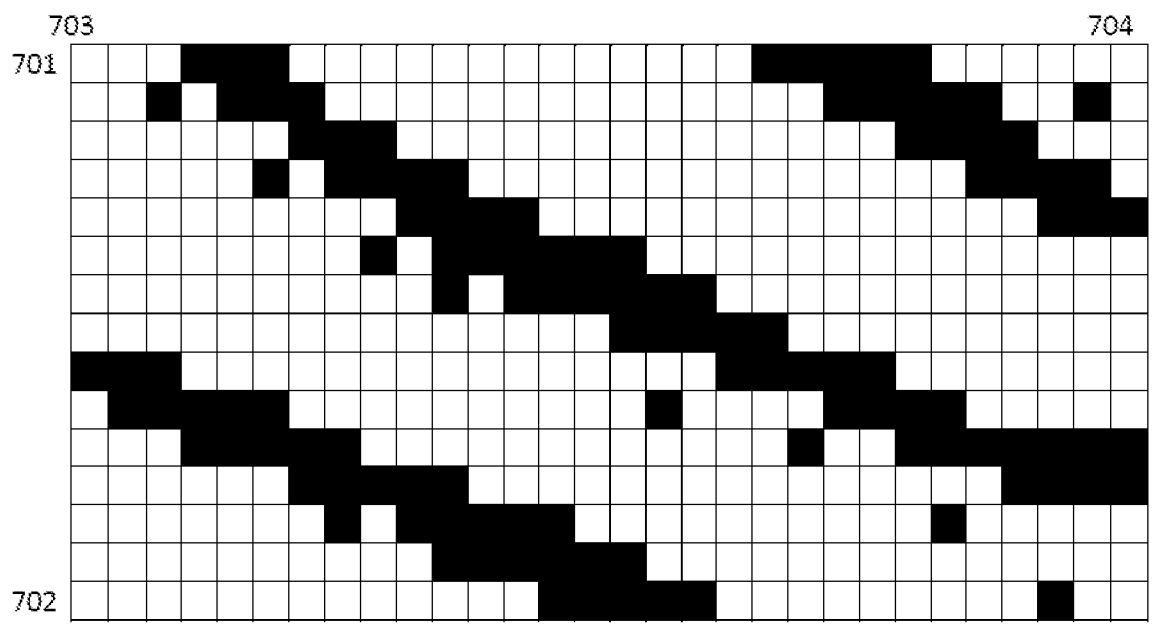
FIG. 7 shows a sample table of intermodulation intensities for three input channels.

Similar process is possible for dual and three channel receiver and example of 2D intermodulation table measured offline and used for selection of LO pairs is shown on FIG. 6 for dual channel receiver and on FIG. 7 for three channel receivers. All three examples on FIGS. 5 to 7 are measured with same process and only difference is selection of the value for each cell. In two and three channel case maximum value from the two or three measured is used for all LO combinations where multiple valid values are possible. If due to the combination of LO frequencies one or more channels is sampled out of the band of interest, then measured value for that channel is ignored.

Figure 8:
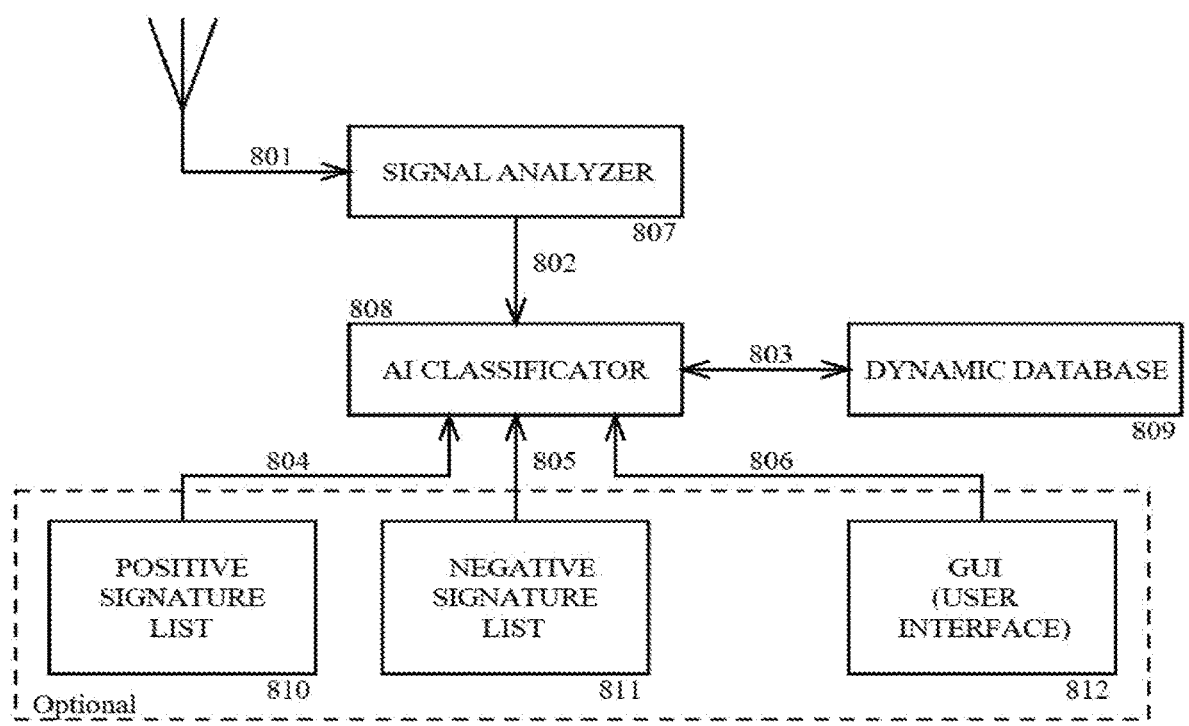
FIG. 8 discloses the flow chart describing classification method for radar signal detectors with AI aided signature classification.

FIG. 8 is presenting high level diagram of the classification method for in-vehicle radar detectors with AI aided signature classification. Signal is analyzed in the signal analyzer module depending on the detector architecture and spectral signature is delivered to AI module. Signal signature is consisting of spectral power distribution (spectral peaks list) with frequencies, amplitudes and phase for each detected peak. Signature is being delivered to the AI module all the time it is being detected, and AI is tracking spectral changes over time. Alarms are issued by the AI to the user over a user interface (UI) on detected signals of interest. Together with decision making on detected signal type AI module is also constantly calculating score of the classification which is reflecting how certain the classification is. The ones with a high score are also resulting in an update to the dynamic signature database. In another embodiment the classification method is using positive and negative database of verified signatures and it is also implementing a user interface (UI) for a user to classify manually of detected signals. In a case when a user classifies detected signal manually, signature for this signal is added to dynamic database with a high score.

Figure 9:
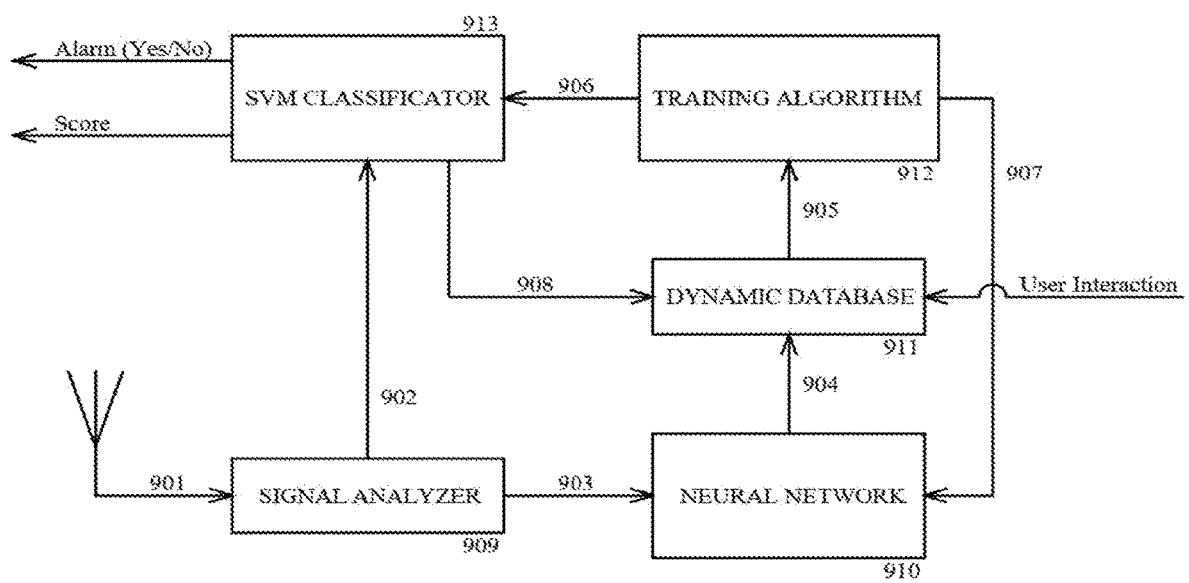
FIG. 9 discloses the flow chart describing detail flow diagram of AI classification with dynamical database updating and retraining process for SVM and neural network for automatic performance upgrade.

Detailed operation of AI module and internal architecture is shown on FIG. 9 where is visible that AI module consists of two parts. First part is slower, heuristics-based detector implemented with neural network, and other part is machine learning model, specifically Support Vector Machine. Machine learning model for classification of signal signatures is initially learned using sufficient set of signal signatures labeled as positives and negatives. On each detected signal during operation of the detector if calculated score of a classification is above a set threshold the signal signature is added to the dynamic database and SVM is retrained with new updated database. Weight factor for all dynamically added signatures is low so the impact of this signatures would not have big effect on the SVM training by itself but with accumulation over time it will affect training of the SVM more and more and contribute to improved detection rate of signals of interest. This approach assures that a small number of possibly wrong classifications will not lead to a generally poor detection rate of the SVM. For those classified signatures that had a lower score than a threshold, the neural network is applied as these signatures are considered significantly different than information already in the SVM database. Neural network is pretrained to track and classify signatures with deep learning principle. Classification and score from neural network are then used for update of dynamic database with even lower weight factor but enabling device to slowly learn completely new signatures that appear to be speed measuring radar signals or other signals of interest. Neural network is also periodically retrained with new dynamic database but for this training process only signatures classified by SVM or users' inputs are used.

Preferred Embodiment

The circuitry and the functional detail of the preferred embodiment in accordance with the invention will be explained in detail in the following paragraphs.

Figure 1:
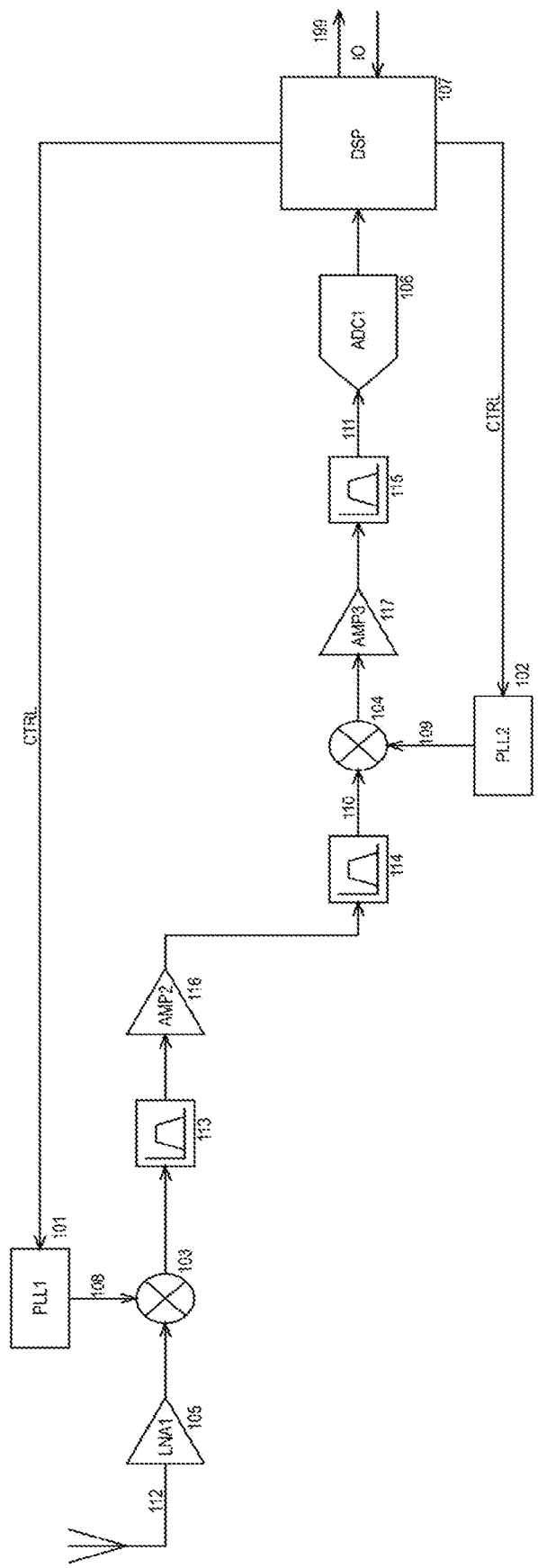
FIG. 1 shows a block diagram of the circuit with a single RF input band and two down-converting mixer stages that are controlled by a DSP unit.

In the preferred embodiment as shown in FIG. 1, a circuit is comprised of input RF antenna (112) feeding the input of a low noise amplifier (LNA) (105) and output of LNA is feeding a first stage mixer (103). In the preferred embodiment application, a high bandwidth detector antenna is designed in a way that it also acts as bandpass filter so the discrete bandpass filter before the first LNA is omitted. First mixer (103) receives LO signal from the first generator (101) on the LO port (108) and input RF signal on the RF port (112) and is producing an intermediate frequency (IF) signal on its IF port. IF signal is than fed to an IF bandpass filter (113) to extract only the desired signal bandwidth. IF bandpass filter (113) is defining the possible scan range for the first generator (101) and good practice is to have this filter as wide as possible to allow scanning of the whole frequency range, but still narrow enough to keep signal noise as low as possible. Filtered IF signal is than amplified with the amplifier (116) and filtered again with bandpass filter (114). This amplified and filtered signal is fed to the RF input port of the second mixer (104). LO port of the second mixer is fed with the second generator's (102) output and resulting mixer IF signal after the second down-conversion is the baseband signal (104) on the output port. Baseband signal (104) is amplified (117), filtered (115) and analog to digital converted (ADC) with ADC1 (106). Digital stream from ADC1 (106) is delivered to DSP circuit (107) and used for further signal processing in digital domain.

Figure 2:
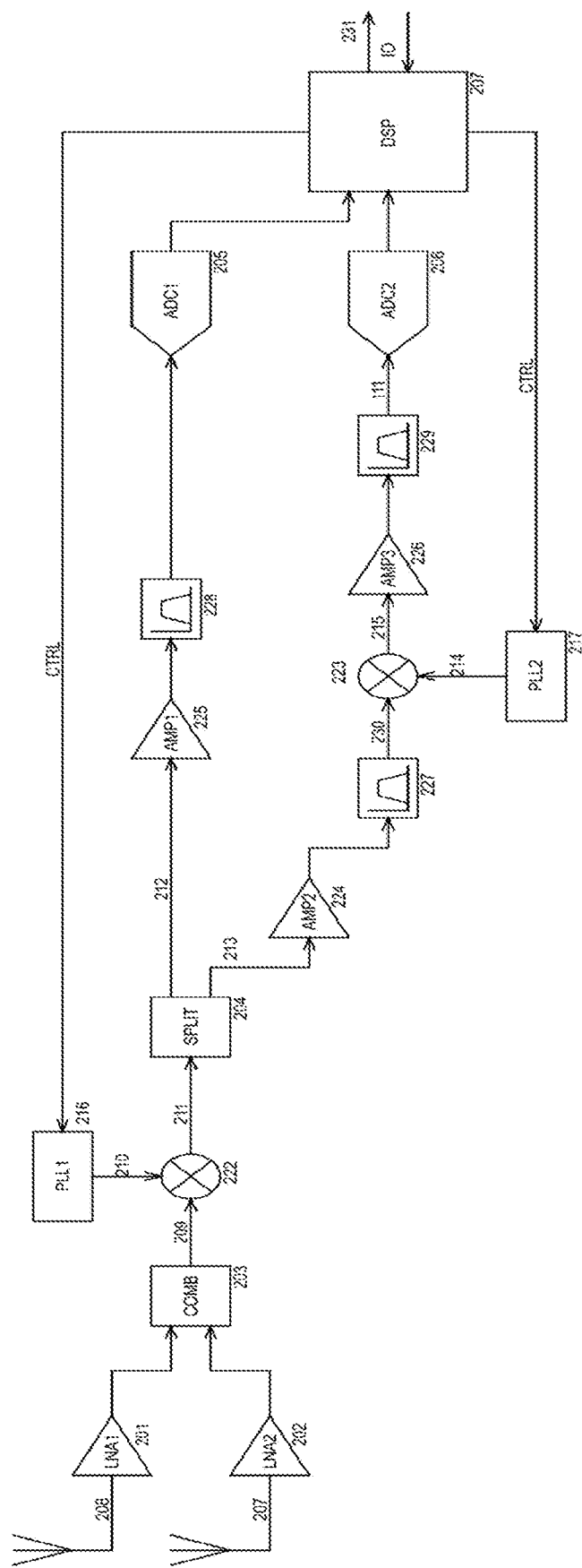
FIG. 2 shows a block diagram of the circuit with a dual RF input bands and two down-converting mixer stages that are controlled by a DSP unit.

Additional RF channel is added to a circuit on FIG. 1, as shown in FIG. 2 with additional RF input comprising of input antenna (207) and low noise amplifier (202) followed by signal combiner (203) where two input signals are combined prior to the first mixing (222) additional possibility to scan two channels in parallel is possible on the detector. For efficient operation usually one of these channels has significantly wider bandwidth. In a receiver as shown on the FIG. 2 additional dependency is introduced between a generator 1 (216) and a generator 2 (217) causing further reduction in possible valid frequency pairs for two generators LO signals. IF signal of the first mixer (222) is split to baseband of the first RF input channel (212) practically creating direct down-conversion receiver and on the same spot IF for the second wider RF channel is extracted and forwarded to the second mixer. Baseband of the first channel (212) is amplified (225) and filtered (228) after the splitter (204) and converted by ADC1 (205) to digital domain. Filtering on the baseband side after the first mixer will eliminate out-of-band unwanted signal but interference and crosstalk with frequency range falling in the channel bandwidth will stay and must be eliminated by selection of LO frequencies. IF channel of the second RF input is after splitter (204) amplified (224) and filtered (227) and mixed (223) with signal generated by the second (217) LO signal generator. Filtering of IF signal (213) between the first mixer (222) and the second mixer (223) will eliminate all out-of-band unwanted signals but would not have effect on signals in the channel bandwidth. Output of the second mixer (223) is baseband for the second RF input and is amplified (226), filtered (229) and converted to digital domain with ADC2 (206). Same effect as for the first channel will be achieved with filtering on the baseband side and same problem with intermodulation and crosstalk falling in the channel bandwidth will stay. Additional digital processing steps are done in the DSP module (207) for both signals.

Selection of the best pairs of the frequencies for LO generators out of a union of all possible segment pairs is process done offline, measured on several temperatures and input power supply voltage as all those parameters can affect quality of selected pair. The procedure is comprised of signal recording for all possible pairs in the complete frequency band for both RF channels and measurement of quality parameters for each segment. 2D table shown on the FIG. 5 is created and stored to the DSP memory by division of the segment peak value with segment average noise value for booth channels and bigger value is selected representing worse case for those combination of frequency pairs. For pairs that are not resulting with proper channel selection for both channels as one of the channels, usually narrower band one, will be out-of-the-band for such combination, the value for valid channel is used. Optimal asset allocation algorithm is applied to the stored table to select best LO frequency pairs, cells with minimal value of calculated ratio between peak and average noise value, with uniform distribution of scanning along the frequency bandwidth for both channels and uniform repetition of scanning for both channels. Sorting is applied to the selected scanning pattern to further minimize number of frequency changes for both generators with additional restriction to maintain uniform scanning for both channels. Resulting array with selected LO frequency pairs for all segments is than stored in the DSP memory and is used in the real-time operation of the device.

Figure 3:
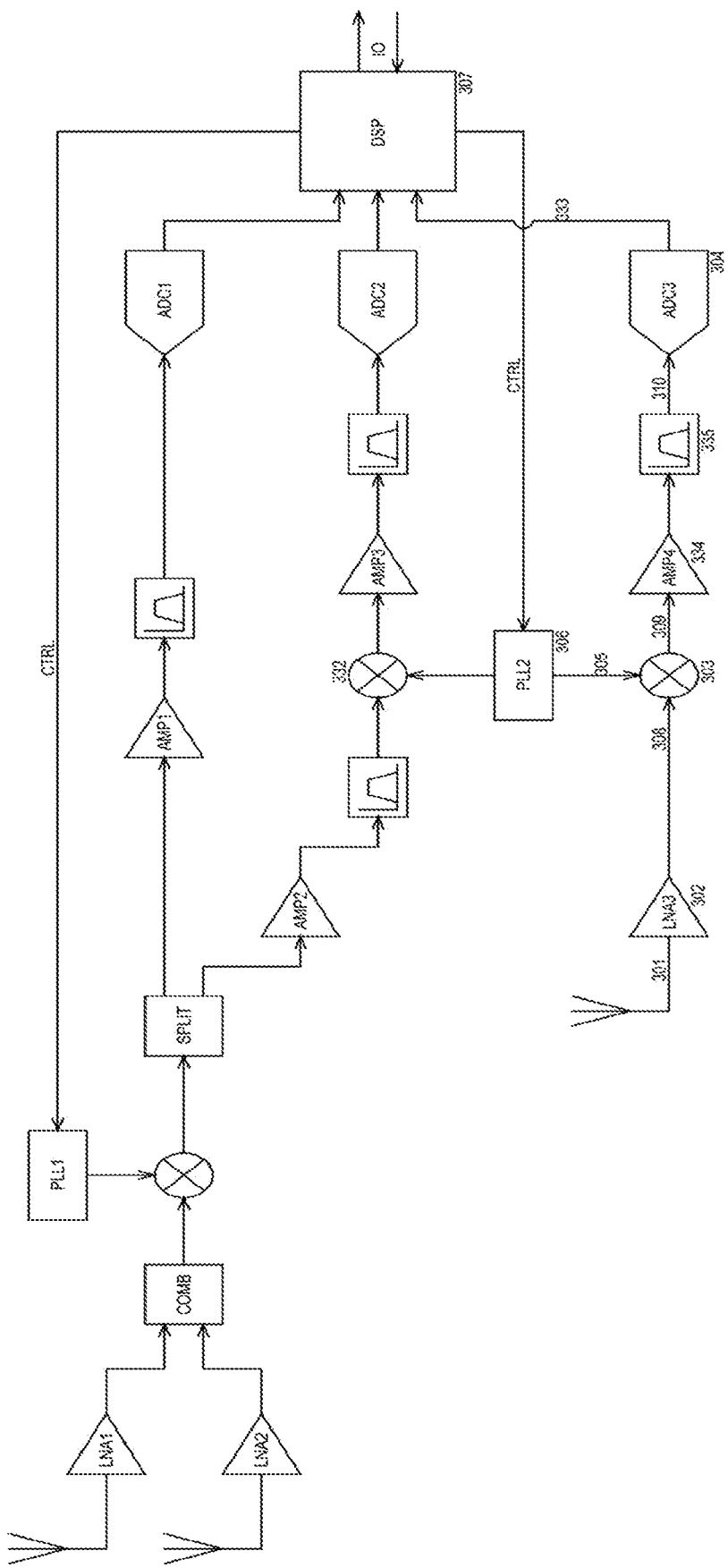
FIG. 3 shows a block diagram of the circuit with a triple RF input bands and two down-converting mixer stages that are controlled by a DSP unit.

By adding an additional RF input (301 & 302), additional mixer (303), baseband processing hardware comprising of amplifier (334), bandpass filter (335), ADC3 (304) and without adding another LO signal generator, it is possible to realize a detector embodiment with three RF inputs scanning, as shown on FIG. 3. In this detector device RF channel 1 and RF channel 3 are narrower band than wideband RF input channel 2. Crosstalk and intermodulation in this embodiment would also pose a problem if the disclosed method would not be applied, causing a poor sensitivity or improper detection alarms. Filtering on baseband side prior to the analog to the digital conversion is used to eliminate most of the intermodulation and image signals falling out-of-band, but crosstalk and intermodulation in band will appear in the channel bandwidth. Those intermodulation and crosstalk components that will fall in the channel band are eliminated/minimized with same method as for single or dual channel system. Selection of best scanning sequence for LO signal generators is again possible, but again with additional restrictions due to the limiting factors of different bandwidths for different channels since uniform repetition of segments scanning for all channels is required.

Selection of the best pairs of the frequencies for LO generators out of a union of all possible segment pairs is again process done offline, measured on several temperatures and input power supply voltage as all those parameters can affect quality of selected pair. The procedure is comprised of signal recording for all possible pairs in the complete frequency band for all three RF channels and measurement of quality parameters for each segment. 2D table shown on the FIG. 6 is created and stored to the DSP memory by division of the segment peak value with segment average noise value for all channels and maximal value is selected representing worse case for those combination of frequency pairs. For pairs that are not resulting with proper channel selection for all channels as one of the channels, usually narrower band one, will be out-of-the-band for such combination, the maximal value for valid channels is used. Optimal asset allocation algorithm is applied to the stored table to select best LO frequency pairs, cells with minimal value of calculated ratio between peak and average noise value, with uniform distribution of scanning along the frequency bandwidth for all channels and uniform repetition of scanning for all channels. Sorting is applied to the selected scanning pattern to further minimize number of frequency changes for both generator generators with even more restriction to maintain uniform scanning for all three channels. Resulting array with selected LO frequency pairs for all segments is than stored in the DSP memory and is used in the real-time operation of the device.

Figure 4:
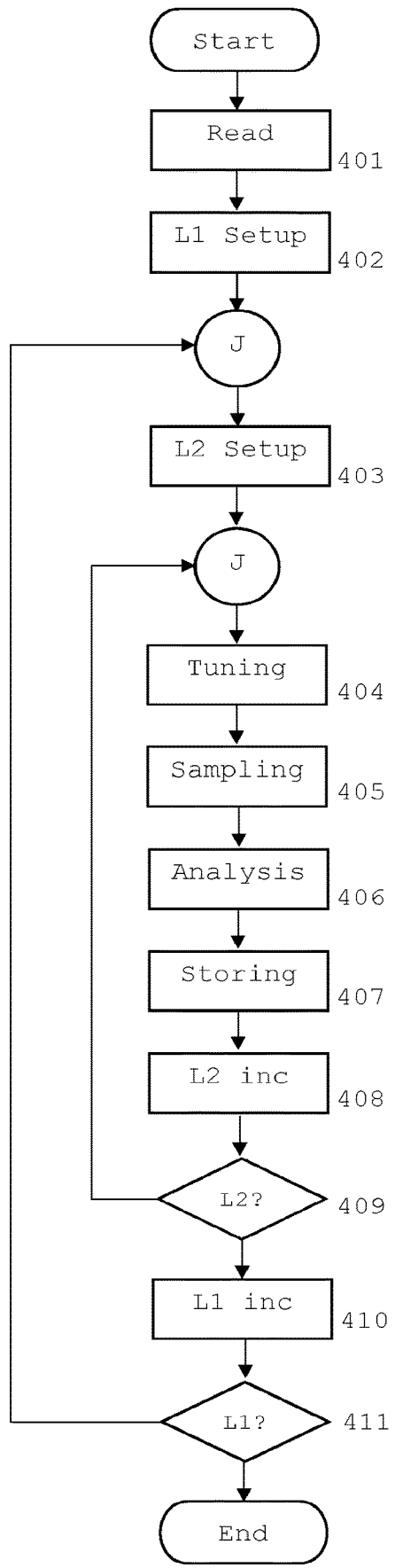
FIG. 4 discloses the flow chart describing the calibration process during which noise and coefficient values are measured and stored into a device's memory.

The following is the procedure of calibration of noise values for all possible LO segment pairs and temperatures that is performed beforehand and the values stored in the memory of the DSP unit, as shown on the FIG. 4:

401

Calibration starts by reading the system temperature and saving it to variable T_amb

402

Loop L1 counter is setup to the lowest frequency of the PLL1 (101)

L1_c:=PLL1_start

403

Loop L2 counter is setup to the lowest frequency of the PLL2 (102)

L2_c:=PLL2_start

404

Both PLLs are tuned: PLL1 (101) is tuned to the current value stored in L1-c, and PLL2 (102) is tuned to the current value stored in L2_c

405

1 millisecond of data samples received on ADC (106) are stored into temporary memory buffer mem[1 . . . N]

406

Data in memory buffer is converted to amplitudes of spectral representation of the signal by using FFT algorithm
mem:=abs(FFT(mem))

A maximum value is determined in the signal spectra
peak:=max(mem)

An average value of the signal spectra is calculated
avg:=sum(mem)/N

An coefficient representing amount of intermodulation is calculated
imod_cf:=peak/avg

407

A tuple consisting of (T_amb, L1_c, L2_c, imodcf) is stored into device memory

408

Loop L2 counter is incremented
L2_c:=L2_c+L2_step

409

Test whether loop L2 has covered the complete frequency range of PLL2
repeat until L2_c>=PLL2_end

410

Loop L1 counter is incremented
L1_c:=L1_c+L1_step

411

Test whether loop L1 has covered the complete frequency range of PLL1
repeat until L1_c>=PLL1_end Described calibration procedure produces a table of values of intermodulation noise for every pair of LO frequency segments of both generators for the whole LO frequency ranges. Sample tables are shown on FIGS. 5, 6. and 7.

FIG. 5. shows a table sample of intermodulation intensities for single input channel, depending on tuning frequencies of PLL1 and PLL2. PLL1 frequencies change over rows, while PLL2 frequencies change over columns. For clearer presentation, the actual values for each segment are omitted; instead, the segments where the intermodulation intensity value exceed a critical threshold of 1.0 are marked in black. The combination of PLL1 and PLL2 frequencies that result in a segment marked in black contain too much intermodulation noise and should be skipped.

501 Intermodulation intensity values in the first row were measured by setting PLL1 frequency to PLL1_start.

502 Intermodulation intensity values in the second row were measured by setting PLL1 frequency to PLL1_start+PLL1_step.

503 Intermodulation intensity values in the last row were measured by setting PLL1 frequency to PLL1_end.

504 Intermodulation intensity values in the first column were measured by setting PLL2 frequency to PLL2_start.

505 Intermodulation intensity values in the last column were measured by setting PLL2 frequency to PLL2_end.

506 Segments with intermodulation intensities above 1.0 are marked in black.

FIG. 6. shows a table sample of intermodulation intensities for two input channels, depending on tuning frequencies of PLL1 and PLL2. PLL1 frequencies change over rows, while PLL2 frequencies change over columns. For clearer presentation, the actual values for each segment are omitted; instead, the segments where the intermodulation intensity value of either channel 1 or channel 2 exceeds a critical threshold of 1.0 are marked in black. The combination of PLL1 and PLL2 frequencies that result in a segment marked in black contain too much intermodulation noise and should be skipped.

601 Intermodulation intensity values in the first row were measured by setting PLL1 frequency to PLL1_start.

602 Intermodulation intensity values in the last row were measured by setting PLL1 frequency to PLL1_end.

603 Intermodulation intensity values in the first column were measured by setting PLL2 frequency to PLL2_start.

604 Intermodulation intensity values in the last column were measured by setting PLL2 frequency to PLL2_end.

FIG. 7. shows a table sample of intermodulation intensities for three input channels, depending on tuning frequencies of PLL1 and PLL2. PLL1 frequencies change over rows, while PLL2 frequencies change over columns. For clearer presentation, the actual values for each segment are omitted; instead, the segments where the intermodulation intensity value of any of the three channels exceeds a critical threshold of 1.0 are marked in black. The combination of PLL1 and PLL2 frequencies that result in a segment marked in black contain too much intermodulation noise and should be skipped.

701 Intermodulation intensity values in the first row were measured by setting PLL1 frequency to PLL1_start.

702 Intermodulation intensity values in the last row were measured by setting PLL1 frequency to PLL1_end.

703 Intermodulation intensity values in the first column were measured by setting PLL2 frequency to PLL2_start.

704 Intermodulation intensity values in the last column were measured by setting PLL2 frequency to PLL2_end.

After signals are down-converted by proposed single, dual or three channel detector circuit with intermodulation and crosstalk reduction additional steps of digital signal processing is applied. Detection of the signals can be observed in three groups that are implemented in digital signal processing: short pulses detection (POP signals), CW (continuous wave) detection, 3D or modulated signals detection. The first two groups are relatively simple to detect by tracking of the received signal in time and by applying rule of single spectrum peak to the detection. Modulated signals are much more complex to detect as there will be several or large number of peaks in the spectrum and waveform of such signals is varying through time. For such signals special detection algorithm is implemented that is tracking signal peak distribution in the frequency spectrum of the signal and is tracking the changes of this frequency spectrum peak distribution through time. Distribution of the frequency spectrum peaks of the signals is also shortly called spectrum signature or signal signature.

Classification of the spectrum signature is important feature for an in-vehicle radar detectors as it is important to distinguish between vehicle inbuilt anti-collision and adaptive cruise control radars integrated in more and more modern vehicles and speed measuring radars that are usually mounted aside the road or overhead the traffic lanes. Due to a large number of both inbuilt radars and speed measuring radars and new models being introduced to the market daily, it is very complex task to develop classification of those signals based on only known radars signatures and such approach would certainly miss detections of all new radars not already in the signature database.

Artificial intelligence (AI) supported classification of detected signals is implemented in a digital signal processing unit (107) for the purpose of alarming a user of detected speed measurement radar signals and discarding other detected signals arriving from other sources, wherein SVM (Supported Vector Machine) (913) is used for classification of detected signals, and the SVM is initially trained from a database of known signals belonging to speed measuring radars and to other non-interesting sources, and where the SVM is dynamically retrained when an unknown signal is detected and classified by AI neural network (910) with high confidence, resulting in better specialization of the SVM model and giving better classification results from then on.

Signal signature (902) is used as the input to the SVM classificatory (913) and each SVM classification is accompanied by certainty score. When certainty score for a received signal is above a set threshold, classification is considered as signal of interest, a signal signature is added to the dynamic database (911). When, for a received signal signature, certainty score is under a threshold, heuristics part of AI module implemented with neural network (910) is employed to classify the signal signature. If classification of heuristic algorithm is considered confident enough, this signature with neural network (910) classification is added to dynamic signature database (911) but with lower score. SVM (913) is than retrained periodically so that new signal signatures are accounted for, and that accuracy of classification is increased.

Heuristic algorithm in the AI (808) module used for classification of unknown signals is neural network (910) with deep-learning method (912) used for training. On the input of neural network spectrum signature (903) is applied with up to 128 spectral peaks consisting of spectral peak amplitude and frequency. If spectral signature (903) is composed by lower number of spectral peaks than only those extracted from the signal are used and the rest is set to zero. Neural network (910) is processing the inputs and output (904) is composed by two numbers, where the first is binary number 1 or 0 signaling with 1 speed measuring radar classification and with 0 other radar type classification. The second output number is integer signaling confidence prediction in the range from 0 to 100. Training of the neural network (910) is done in the laboratory by presenting to the input of the network large number of known signal signatures and compering the output with known classification. Parameters of each neuron element in the neural network are than changed to get better classification for each sample and better convergence for the whole sample set in general. Control set of signal signatures with known classification that were not used in training process is used to check classification during the training process. Training process in iteratively repeated until satisfactory result of classification on whole training and check set are achieved.

During the operation of the detector neural network (910) is periodically retrained with updated training set stored in the dynamical database (911) together with preconfigured verified database of known signatures. For training of the neural network (910) only signatures classified with SVM (913) with sufficient classification score are used.

To aid even better true/false alarm ratio and to improve dynamical database (911) creation and training process for both SVM (913) and neural network (910) it is possible to add interaction with user through system UI (User Interface). The feedback from the user is used to manually classify alarms (accept/reject) and information if available can be used for supervised learning mode. Process is done similarly to the unsupervised mode without user interaction where SVM (913) is used for classification of detected signals, and the SVM (913) is initially trained from a database of known signals belonging to speed measuring radars and to other non-interesting sources. When an unknown signal is detected, classification by neural network (910) is used and if high confidence is achieved signature is added to dynamical signature database (911), resulting in better specialization of the SVM (913) model and giving better classification results after retraining. In supervised mode, user interaction is used to confirm/reject AI classification and the signature is stored to the dynamical signature database (911) with much higher score than only AI classified signatures (803), resulting in more impact to the retraining process of SVM (913) and neural network (910) and thus better classification of similar signal signatures from now on.

For proposed detector device with function of suppressing of RF interference to increase sensitivity of RF receiver circuit with single, dual or three channels it is important to use DSP module with possibility to control 2 separate PLL LO signal generators, interface one, two or three fast analog to digital converters with sufficient bandwidth and dynamical signal range for proper signal signature extraction even for low power and weak signals.

RF receiver circuit of detector is required to achieve sufficient sensitivity for wideband channels and filtering of out-of-band components has to be implemented efficient enough that components of intermodulation that are falling out-of-band do not create additional aliasing and interference in the desired frequency band.

It should be understood that the invention is not limited by the embodiments described above, but is defined solely by the claims.

The invention claimed is:

1. A method of operating a digital signal processor (DSP) which suppresses intermodulation noise in a radio frequency (RF) signal detector, where said RF signal detector, comprises:
    at least one analog-to-digital ADC converter having a defined bandwidth of an input signal to be converted,
    at least two signal generators, each producing a local oscillator (LO) signal where each LO frequency range is divided into segments with a provision that each segment is not wider than the defined bandwidth of the ADC converter and each segment is represented by a segment center frequency,
    at least two RF signal mixers that each down-convert a corresponding input RF signal, using corresponding ones of the LO signals, into respective intermediate frequency (IF) signals,
    at least one RF frontend circuit to receive an antenna RF signal and amplify the antenna RF signal to a level for mixing by corresponding one of the RF signal mixers, and
    a digital signal processing (DSP) circuitry with memory and program logic that controls the signal generators and sets their LO signals,
    where the antenna RF signal processed by the RF frontend circuit is consecutively down-converted; firstly by a first RF signal mixer of the at least two RF signal mixers using a first LO signal obtained from a first signal generator of the at least two RF signal generators and then secondly by a second RF signal mixer of the at least two RF signal mixers using a second LO signal obtained from a second signal generator of the at least two signal generators, resulting in a baseband signal that is then converted in the ADC converter to a digital baseband signal which is fed to the DSP circuitry that processes the digital baseband signal and communicates the digital baseband signal with a user, and
    where said method is characterized by that the LO frequencies of each said signal generators are set by the program logic stored into the DSP circuitry to form a pair of segment center frequencies out of a union of all possible segment pairs which give a desired sum frequency of a desired down-conversion, where said segment pair is known by the DSP circuitry to produce a least mount of intermodulation noise in the RF signal detector caused by crosstalk between the first and second LO signals and components of the RF signal detector relative to all other possible segment paris, and where the intermodulation noise for every possible LO generator segment pair of complete LO ranges has been measured beforehand and prestored into the memory of the DSP ciruitry.

2. The method of operating the digital signal processor (DSP) which suppresses intermodulation noise in the radio frequency (RF) signal detector according to the claim 1,
wherein an average channel noise level and an intermodulation noise signal level within baseband bandwidth are measured across multiple ambient temperatures, and for every possible pair of LO frequency segments over the complete LO ranges during in-factory calibration, and where a coefficient is calculated by dividing measured intermodulation noise signal level with an average measured noise level, which corresponds to an amount of unwanted intermodulation signals in the baseband bandwidth, and is stored in the memory of the digital signal processor (DSP), and
wherein the program logic of the digital signal processor (DSP) uses the coefficient to select the segment pair for the desired down-conversion that produces the least amount of intermodulation noise in the RF signal detector.

3. The method of operating the digital signal processor (DSP) which suppresses intermodulation noise in the radio frequency (RF) signal detector according to the claim 2, where said RF signal detector scans the entire bands of its one or more RF input channels and additionally comprises:
at least two of said RF frontend circuits,
at least one signal combiner,
at least one signal splitter, and
at least two of said ADC converters,
where a first bandwidth of a second RF input channel of the one or more RF input channels is wider than a second bandwidth of a first RF input channel of the one or more RF input channels, and the two RF signals from two different RF frontend circuits are firstly combined to a single signal which is mixed with the first LO signal to produce a combined IF signal, which is split to a first baseband signal of the first input RF channel and an IF signal from the second input RF channel,
where a remaining IF signal from the second input RF channel is mixed with the second LO signal, resulting in a second baseband signal for the second RF input channel, allowing parallel scanning of two different bands, where a first central carrier frequency of the first band is selected by setting a first frequency of the first signal generator, and a second central carrier frequency of the second band is selected as a sum of frequencies of both the first signal generator and the second signal generator,
where the first and second baseband signals are converted in the ADC converters to respective digital baseband signals, including said digital baseband signal, which are fed to the DSP circuitry, and
where said method is characterized by that the stored coefficients are analyzed using an optimal asset allocation algorithm which produces a sequence for setting the at least two signal generators, resulting in fastest possible scanning pattern for scanning the entire bands that also ensures uniform scanning repetitions of both wider and narrower RF input channels, and maintaining that for each combination of the LO frequencies for the at least two signal generators in the sequence of the stored coefficient that corresponds to an amount of intermodulation present in the baseband channel for that given pair of LO frequencies and corresponding at least two signal generators is minimal when compared to all other combinations of LO frequencies of the at least two signal generators that summed together yield a same carrier frequency for the second RF input channel.

4. The method of operating the digital signal processor (DSP) which suppresses intermodulation noise in the radio frequency (RF) signal detector according to the claim 3, where said signal detector additionally comprises:
a third input channel with a second RF frontend circuit,
a third RF signal mixer, and
an additional analog-to-digital ADC converter,
where the second LO signal from the second signal generator is mixed with an input signal from the third input channel,
where a third baseband signal is converted in the ADC converter to a second digital baseband signal which is also fed to a second DSP circuitry, and
where said method is characterized by that parallel three-band scanning, without the need for an additional signal generator in accomplished.

5. The method of operating the digital signal processor (DSP) which suppresses intermodulation noise in the radio frequency (RF) signal detector according to the claim 1, where said signal detector is additionally comprises:
signal amplifiers for IF and baseband signals, and
signal filters to remove produced harmonics of a mixing process,
wherein sensitivity of the signal detector is increased by amplifying the IF and baseband signals and removing harmonics.

6. The method of operating the digital signal processor (DSP) which suppresses intermodulation noise in the radio frequency (RF) signal detector according to the claim 3, where said signal detector additionally comprises:
signal amplifiers for IF and baseband signals, and
signal filters to remove produced harmonics of a mixing process,
wherein sensitivity of the signal detector is increased by amplifying the IF and baseband signals and removing harmonics.

7. The method of operating the digital signal processor (DSP) which suppresses intermodulation noise in a radio frequency (RF) signal detector according to the claim 4, where said signal detector additionally comprises:
signal amplifiers for IF and baseband signals, and
signal filters to remove produced harmonics of a mixing process,
wherein sensitivity of the signal detector is increased by amplifying the IF and baseband signals and removing harmonics.

8. The method of operating the digital signal processor (DSP) which suppresses intermodulation noise in the radio frequency (RF) signal detector according to the claim 1,
where artificial intelligence (AI) supported classification of detected signals is implemented in the DSP circuitry to alarm the user of detected speed measurement radar signals and discard other detected signals arriving from other sources, wherein SVM (Supported Vector Machine) is used for classification of the detected signals, and the SVM is initially trained from a database of known signals belonging to speed measuring radars and to other non-interesting sources, and where the SVM is dynamically retrained when an unknown signal is detected and classified with high confidence, resulting in better specialization of the SVM model and giving better classification results from then on.

9. The method of operating the digital signal processor (DSP) which suppresses intermodulation noise in the radio frequency (RF) signal detector according to the claim 8, wherein when SVM is dynamically updated, the user is allowed to manually override the dynamic update by providing a response through a user-interface instructing the SVM whether the signal is correctly classified by the SVM and whether SVM should be automatically retrained to include the new detected signal for future detection.

10. A digital signal processor which suppresses intermodulation noise in the radio frequency (RF) signal detector comprising circuitry to perform the method of claim 1.

11. Use of the radio frequency (RF) signal detector with the digital signal processor which suppresses intermodulation noise according to claim 10 for use in a spectral analyzer instrument or in a speed measuring radar detector device.

* * * * *